(12) United States Patent
Fu

(10) Patent No.: US 11,402,570 B2
(45) Date of Patent: Aug. 2, 2022

(54) BACKLIGHT MODULE AND DISPLAY DEVICE

(71) Applicants: K-Tronics (Suzhou) Technology Co., Ltd., Jiangsu (CN); BOE Technology Group Co., Ltd., Beijing (CN)

(72) Inventor: Guosheng Fu, Beijing (CN)

(73) Assignees: K-Tronics (Suzhou) Technology Co., Ltd., Suzhou (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/480,046

(22) Filed: Sep. 20, 2021

(65) Prior Publication Data

US 2022/0155515 A1　May 19, 2022

(30) Foreign Application Priority Data

Nov. 17, 2020　(CN) .......................... 202011288932.2

(51) Int. Cl.
*G02F 1/1333*　(2006.01)
*F21V 8/00*　(2006.01)

(52) U.S. Cl.
CPC .......... *G02B 6/0088* (2013.01); *G02B 6/002* (2013.01); *G02F 1/133314* (2021.01)

(58) Field of Classification Search
CPC ........................ G02F 1/133314; G02B 6/0088
See application file for complete search history.

(56) References Cited

U.S. PATENT DOCUMENTS

2016/0341887 A1* 11/2016 Fang ..................... G02B 6/0088
2021/0266493 A1*　8/2021 Chai ................. G02F 1/133314

\* cited by examiner

*Primary Examiner* — Karabi Guharay
(74) *Attorney, Agent, or Firm* — IPro, PLLC

(57) ABSTRACT

Disclosed are a backlight module and a display device. The backlight module includes a back plate, an optical film assembly and a limiting assembly. The back plate includes a base plate and a folded edge formed at an edge of the base plate. The base plate and the folded edge cooperate to define an accommodating space. The folded edge is provided with notches at top corners of the back plate. The optical film assembly is arranged in the accommodating space. The limiting assembly limits a relative position between the optical film assembly and the back plate and includes back plate corner stops in one-to-one correspondence to the notches, and the back plate corner stops are fixedly arranged at the notches of the back plate. The display device includes the backlight module and a frame fixedly arranged on the periphery of the folded edge of the back plate.

19 Claims, 7 Drawing Sheets

BACKLIGHT MODULE AND DISPLAY DEVICE

This application claims priority to Chinese Patent Application No. 202011288932.2, filed on Nov. 17, 2020, which is hereby incorporated by reference in its entirety.

FIELD

The present disclosure relates to the field of display, in particular to a backlight module and a display device.

BACKGROUND

In recent years, as a display device has become thinner and lighter, taking a back plate and a sealant as exterior parts of the display device has gradually become a development trend.

SUMMARY

The present disclosure provides a backlight module and a display device.

The present disclosure provides a backlight module including: a back plate, including a base plate and a folded edge formed at the edge of the base plate, where the base plate cooperates with the folded edge to define an accommodating space, and the folded edge is provided with notches at top corners of the back plate; an optical film assembly, arranged in the accommodating space; and a limiting assembly, configured to limit a relative position between the optical film assembly and the back plate, where the limiting assembly includes back plate corner stops in one-to-one correspondence to the notches, and the back plate corner stops are fixedly arranged at the notches of the back plate.

In some embodiments, the folded edge includes a plurality of sub-edges arranged in a circumferential direction of the back plate, and at a notch, two adjacent sub-edges are provided with missing portions to form the notch; and the back plate corner stops are in one-to-one correspondence to the notches of the folded edge, and the back plate corner stops each include two limiting portions that are angled and connected to each other.

In some embodiments, a folded edge remaining portion is arranged between the notch and the base plate, and the limiting portion is provided with a concave portion for being matched with the folded edge remaining portion.

In some embodiments, a portion, configured to connect to the sub-edge, of the limiting portion is a connecting portion, and the surface, facing away from the accommodating space, of the connecting portion is located on the inner side of the sub-edge and abuts against the sub-edge.

In some embodiments, a bent portion extending into the accommodating space is formed at the end, far away from the base plate, of the sub-edge, and the connecting portion is snap-fitted with the bent portion.

In some embodiments, the surface, facing away from the base plate, of the connecting portion subsides on the side facing away from the accommodating space to form a limiting step, the part, used for being connected with the connecting portion, of the bent portion includes an insertion portion, and the insertion portion is snap-fitted with the limiting step.

In some embodiments, the surface, facing the back plate, of the back plate corner stop is bonded to the back plate.

In some embodiments, the back plate corner stop is an elastomer.

The present disclosure also provides a display device, including any one of the backlight modules provided in the above embodiments, a frame fixedly arranged on the periphery of the folded edge of the back plate, and a display module arranged on the frame.

In some embodiments, the frame includes a frame-shaped body and a supporting portion formed on the inner surface of the body, and the supporting portion extends into a space defined by the body; the surface, facing away from the base plate, of the back plate corner stop subsides on the side facing the accommodating space to form a first step, a second step corresponding to the first step is formed on the supporting portion, and the first step and the second step cooperate to block the light leakage path at the notches of the folded edge.

In some embodiments, the second step is farther from the body of the frame than the first step.

In some embodiments, the display device is a rectangular display device without bezels on three sides or a rectangular display device without bezels on four sides.

Figure 1:
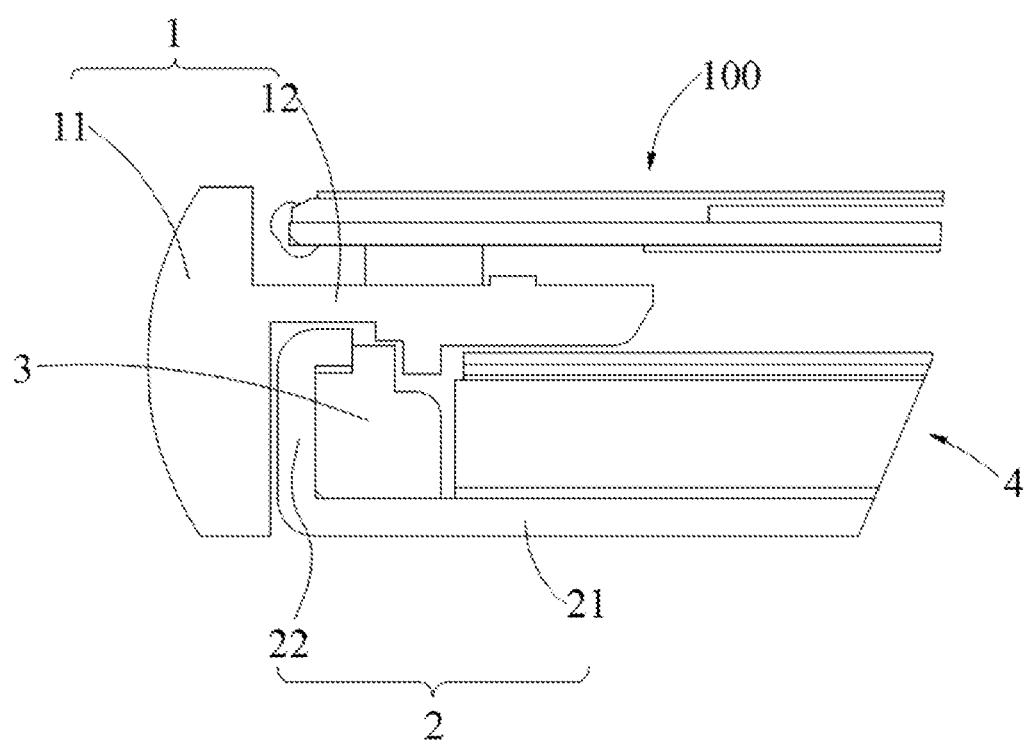
FIG. 1 is a partial structural schematic diagram of a display device provided by an embodiment of the present disclosure.

Reference numerals: 1—frame; 11—body; 12—supporting portion; 121—second step; 2—back plate; 21—base plate; 22—folded edge; 220—notch; 221—sub-edge; 222—bent portion; 224—insertion portion; 225—folded edge remaining portion; 3—back plate corner stop; 31—limiting portion; 310—connecting portion; 311—first step; 312—limiting step; 314—concave portion; 4—optical film assembly; 100—display module.

DETAILED DESCRIPTION OF THE EMBODIMENTS

The technical solutions in the embodiments of the present disclosure will be clearly and completely described below in conjunction with the accompanying drawings in the embodiments of the present disclosure. Obviously, the described embodiments are only a part of the embodiments of the present disclosure, rather than all the embodiments. Based on the embodiments of the present disclosure, all other embodiments obtained by those of ordinary skill in the art without creative work shall fall within the protection scope of the present disclosure.

Figure 2:
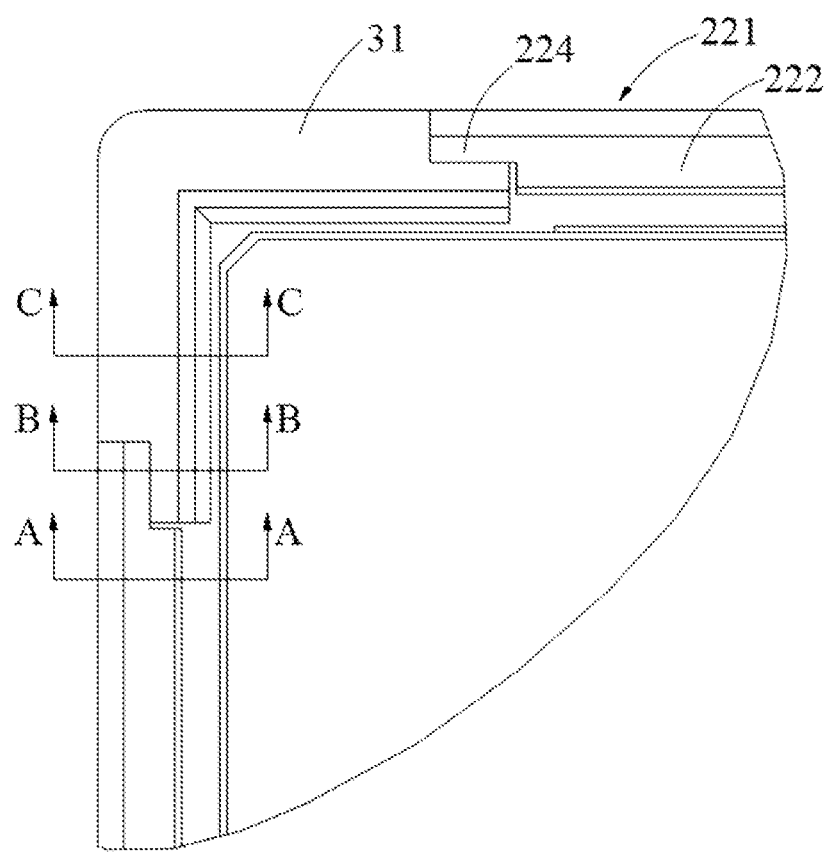
FIG. 2 is a partial structural schematic diagram of a backlight module provided by an embodiment of the present disclosure.

As shown in FIG. 1 and FIG. 2, a backlight module provided by an embodiment of the present disclosure includes: a back plate 2, including a base plate 21 and a folded edge 22 formed at an edge of the base plate 21, where the base plate 21 cooperates with the folded edge 22 to define an accommodating space, and the folded edge 22 is provided with notches 220 at the top corners of the back plate 2; an optical film assembly 4, arranged in the accommodating space; and a limiting assembly, configured to limit a relative position between the optical film assembly 4 and the back plate 2, where the limiting assembly includes back plate corner stops 3 in one-to-one correspondence to the notches 220, and the back plate corner stops 3 are fixedly arranged at the notches 220 of the back plate 2.

In the backlight module provided by the embodiment of the present disclosure, the back plate corner stops 3 are arranged at the notches 220 of the folded edge 22 at the top corners of the back plate 2, and the respective back plate corner stops 3 cooperate to limit the relative position between the optical film assembly 4 and the back plate 2, so that the limiting of the optical film assembly 4 in the accommodating space defined by the base plate 21 and the folded edge 22 through cooperation is achieved, and the limiting problem of the optical film assembly when the back plate and the sealant are used as exterior parts can be solved.

The back plate 2 is a metal piece (e.g., an iron piece). Taking a rectangular display device as an example, during the processing of the back plate 2, process notches may be generated at the four top corners.

In order to make the appearance of the backlight module more beautiful, the base plate 21 may be a flat plate.

Figure 3:
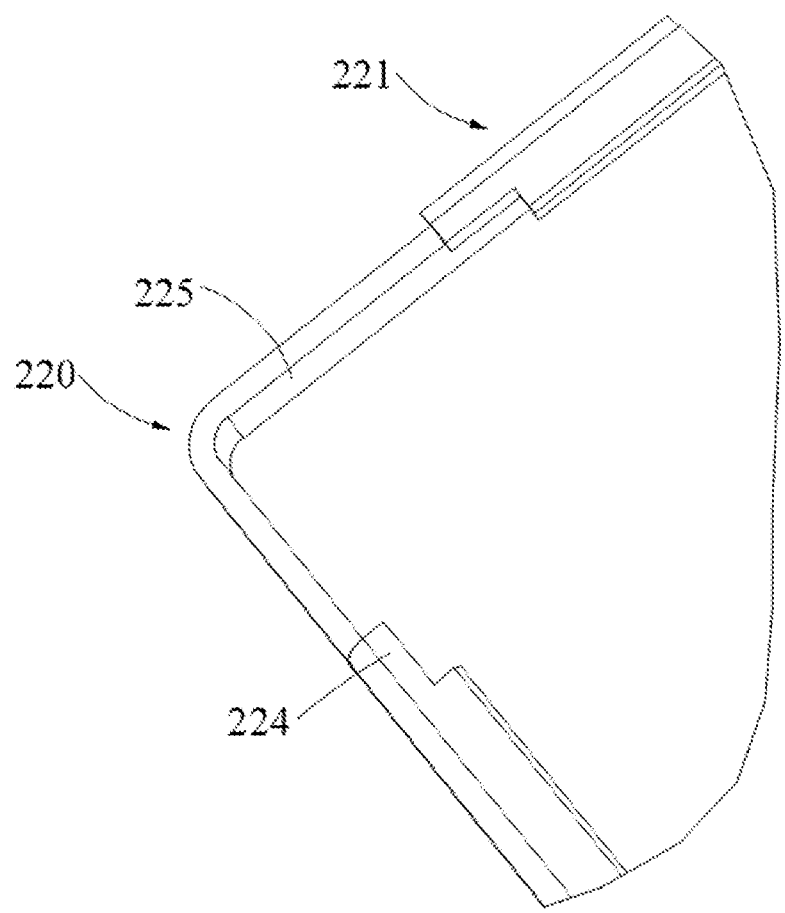
FIG. 3 is a structural schematic diagram of a back plate in a backlight module provided by the embodiment of the present disclosure.

In some embodiments, the folded edge 22 includes a plurality of sub-edges 221 arranged along a circumferential direction of the back plate 2. As shown in FIGS. 2 and 3, at the notch 220 of the folded edge 22, two adjacent sub-edges 221 are provided with missing portions to form the notch 220. The back plate corner stops 3 are in one-to-one correspondence to the notches 220 of the folded edge 22. In order to make the appearance of the backlight module more regular and have a better limiting effect on the optical film assembly 4, optionally, the back plate corner stop 3 includes two limiting portions 31 that are angled and connected to each other.

Figure 4:
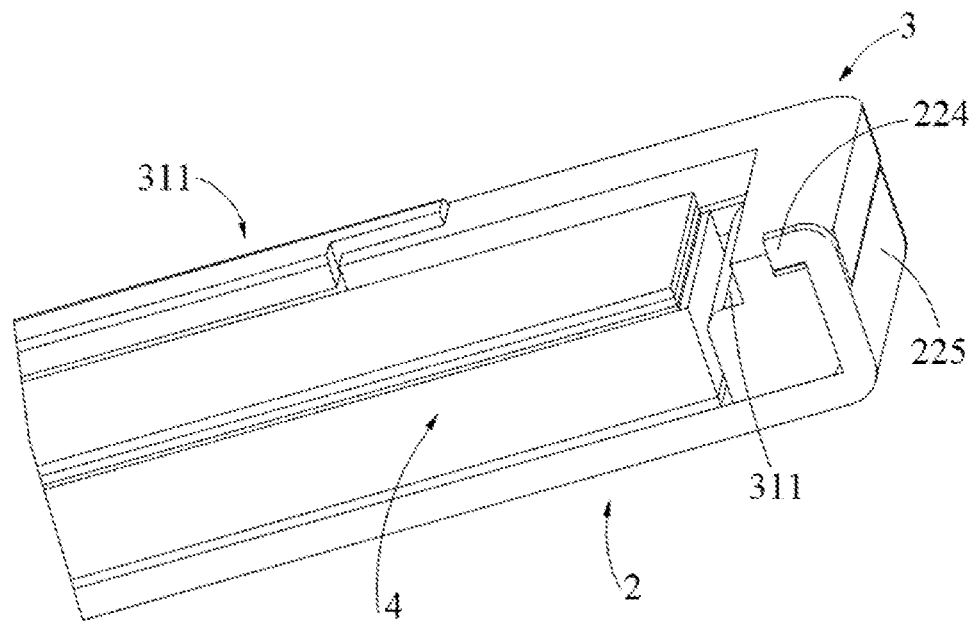
FIG. 4 is a partial structural schematic diagram of a backlight module provided by an embodiment of the present disclosure.
Figure 5:
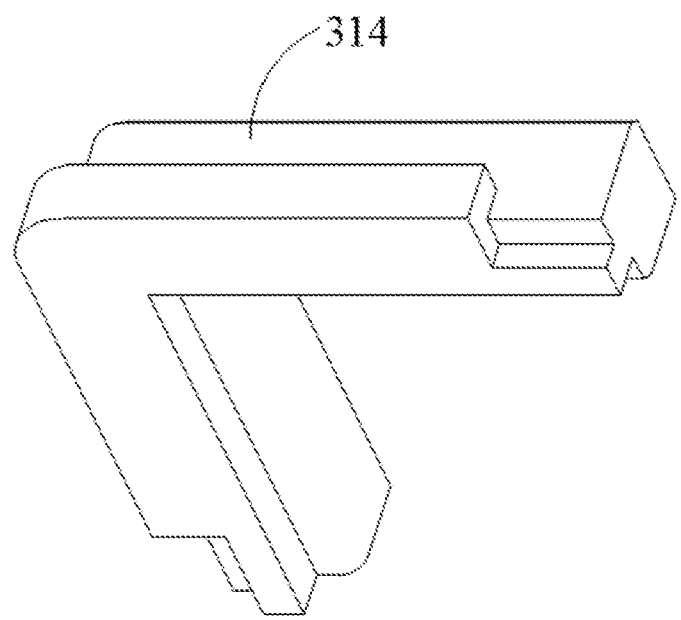
FIG. 5 is a structural schematic diagram of a back plate corner stop in a backlight module according to the embodiment of the present disclosure.

Referring to FIGS. 4 and 5, in some embodiments, a folded edge remaining portion 225 is arranged between the notch 220 and the base plate 21, and the limiting portion 31 is provided with a concave portion 314 for being matched with the folded edge remaining portion 225. The folded edge remaining portion 225 is matched with the concave portion 314 of the limiting portion 31 to facilitate the installation and positioning of the limiting portion 31 on the back plate 2.

In order to make the appearance of the backlight module more beautiful, the part of the surface, facing away from the accommodating space, of the limiting portion 31 on the side, facing away from the base plate 21, of the concave portion 314 may be coplanar with the surface, facing away from the accommodating space, of the folded edge remaining portion 225.

The part, used for being connected with the sub-edge 221, of the limiting portion 31 is a connecting portion 310. In order to facilitate the installation and positioning of the limiting portion 31 on the back plate 2, the surface, facing away from the accommodating space, of the connecting portion 310 is located on the inner side of the sub-edge 221 and abuts against the sub-edge 221.

In some embodiments, the respective limiting portions 31 are snap-fitted with the back plate 2. As shown in FIG. 4, a bent portion 222 extending into the accommodating space is formed at the end, far away from the base plate 21, of the sub-edge, the connecting portion 310 is snap-fitted with the bent portion 222 to achieve reliable connection between the limiting portion 31 and the back plate 2.

Figure 6:
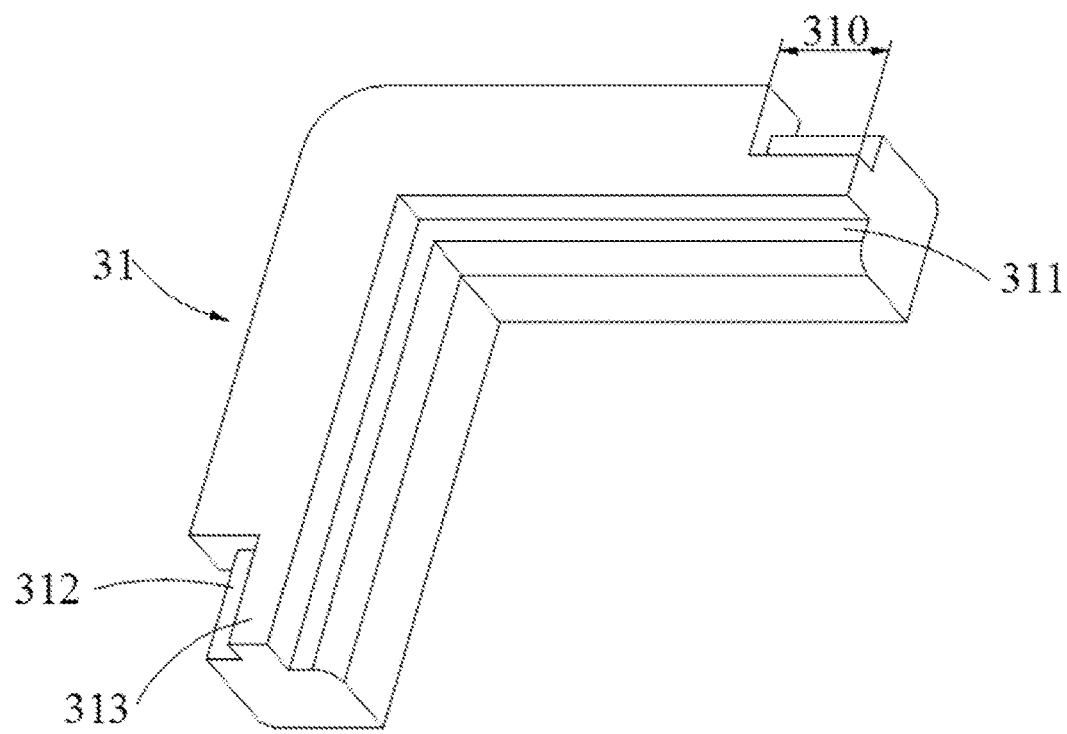
FIG. 6 is a structural schematic diagram of the back plate corner stop in the backlight module provided by the embodiment of the present disclosure from another angle.

In some embodiments, as shown in FIGS. 4 and 6, a surface, facing away from the base plate 21, of the connecting portion 310 subsides on a side facing away from the accommodating space to form a limiting step 312. The part, used for being connected with the connecting portion 310, of the bent portion 222 includes an insertion portion 224, where the insertion portion 224 is snap-fitted with the limiting step 312.

The principles of the back plate corner stop 3 limiting the optical film assembly 4 and the back plate corner stop 3 connected with the sub-edge 221 will be described below in detail.

As shown in FIG. 4, a surface facing the accommodating space of a portion, located between the first step 311 and the back plate, of the limiting portion 31 is used to limit the optical film assembly 4; the insertion portion 224 of the bent portion 222 is snap-fitted into the limiting step 312 on the connecting portion 310, and a surface, facing away from the accommodating space, of the connecting portion 310 is located on an inner side of a sub-edge and abuts against the sub-edge. The folded edge remaining portion 225 is matched with the concave portion 314, and a portion, located on the side, facing away from the base plate 21, of the concave portion 314 of a surface, facing away from the accommodating space, of the limiting portion 31 is coplanar with a surface, facing away from the accommodating space, of the folded edge remaining portion 225.

In some embodiments, the connection between the back plate corner stop 3 and the back plate 2 is that a surface, facing the back plate 2, of the back plate corner stop 3 is bonded to the back plate 2.

In some embodiments, the back plate corner stop 3 is an elastomer, for example, a back plate corner stop made of silicone.

The back plate corner stop 3 adopts an elastomer to play a role in buffering the optical film assembly 4 while achieving a better limiting effect.

During assembling, the back plate corner stop 3 can be assembled on the back plate 2 by utilizing the recoverable deformation of the elastomer. Specifically, force is applied to make the free ends of the two limiting portions 31 (the free ends of the limiting portions 31 being the ends, far away from the other limiting portion 31, of one limiting portion 31) be close to each other, and then the back plate corner stop is pressed into the back plate 2, after the external force is lost, the limiting portion 31 returns to its original shape and is snap-fitted with the folded edge 22 of the back plate 2 for facilitating assembly. In addition, the elastic back plate corner stop is directly snap-fitted to the back plate 2 and thus cannot easily fall off.

The display device provided by an embodiment includes the above-mentioned backlight module, a frame 1 fixedly arranged on the periphery of the folded edge 22 of the back plate 2 of the backlight module, and a display module 100 arranged on the frame 1.

The display device provided by this embodiment includes the above-mentioned backlight module, and therefore can at least achieve the beneficial effects that the above-mentioned backlight module can achieve, that is, back plate corner stops 3 are arranged at the notches 220 of the folded edge 22 at the top corners of the back plate 2, and the relative position between the optical film assembly 4 and the back plate 2 is limited by cooperation of the respective back plate corner stops 3, so that the limiting problem of the optical film assembly when the back plate and the sealant are used as exterior parts can be solved.

Figure 7:
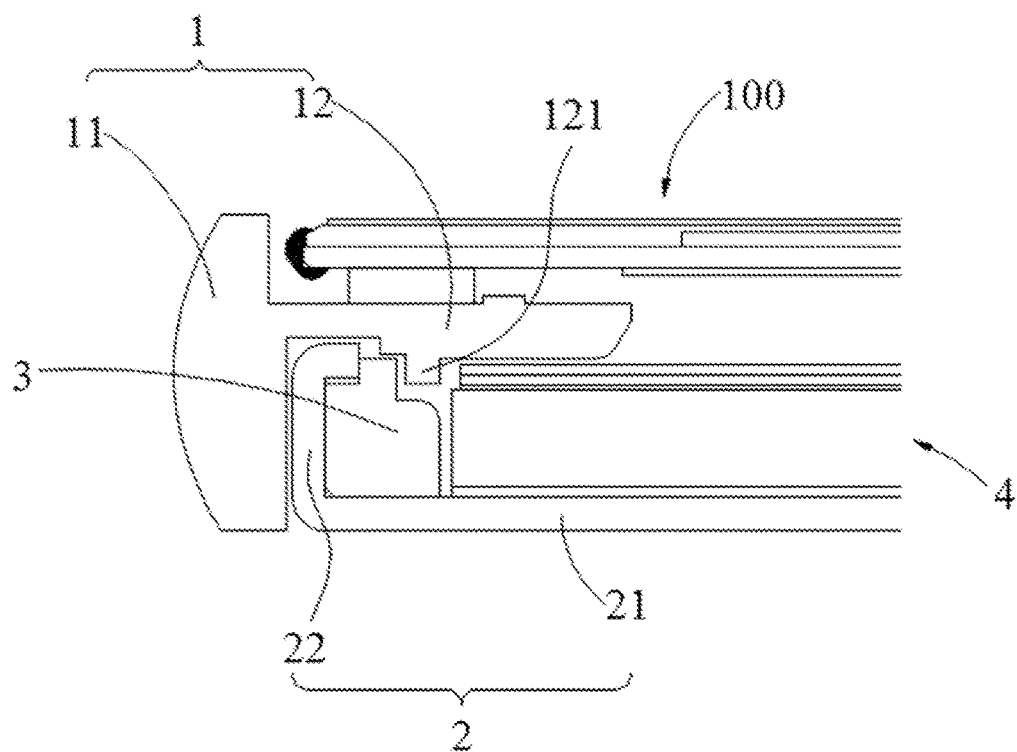
FIG. 7 is a sectional view of FIG. 2 along A-A.
Figure 8:
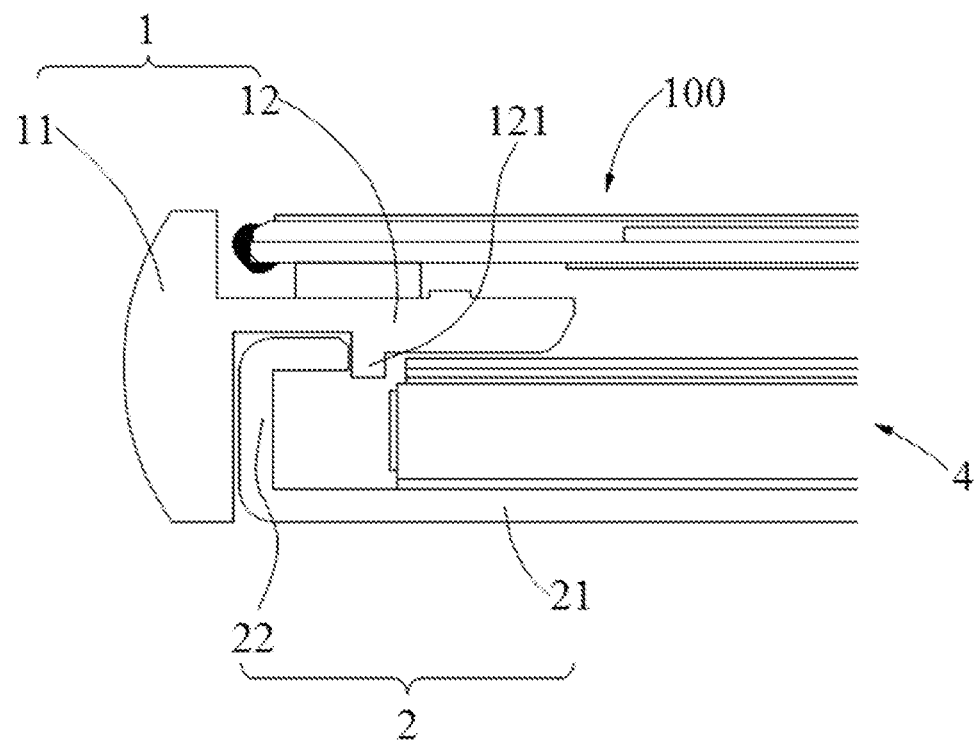
FIG. 8 is a sectional view of FIG. 2 along B-B.
Figure 9:
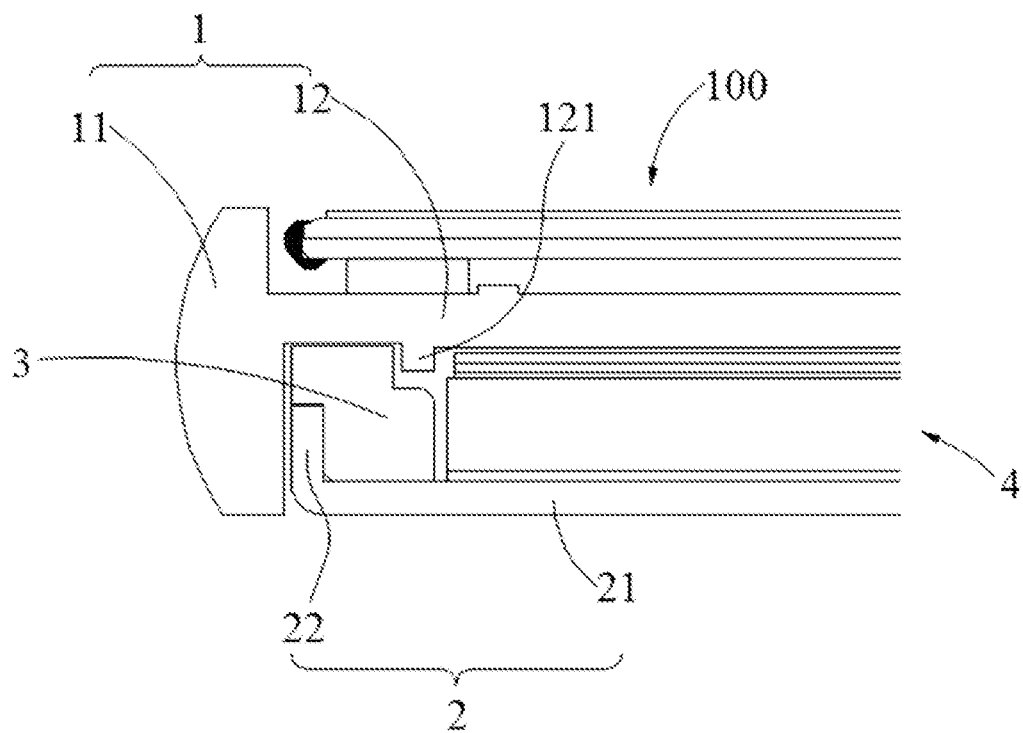
FIG. 9 is a sectional view of FIG. 2 along C-C.
Figure 10:
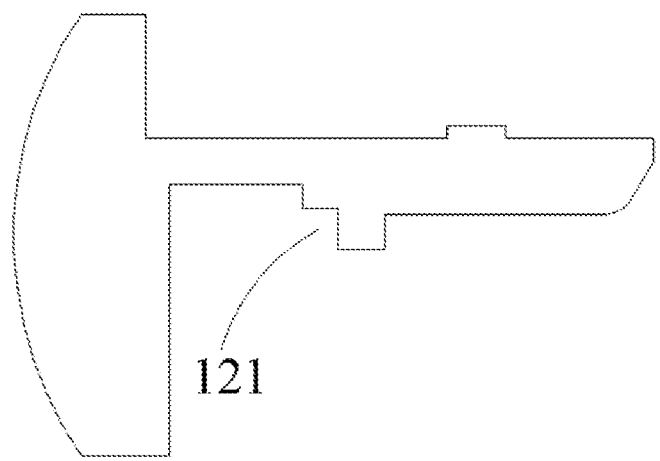
FIG. 10 is a structural schematic diagram of a frame in a display device provided by an embodiment of the present disclosure.

In some embodiments, as shown in FIGS. 7-9, the frame 1 includes a frame-shaped body 11 and a supporting portion 12 formed on an inner surface of the body 11, where the supporting portion 12 extends into a space defined by the body 11 and is used to support the display module 100.

in order to block the light path and prevent light leakage between the back plate 2 and the frame 1, the surface, facing away from the base plate 2, of the back plate corner stop 3 subsides on the side facing the accommodating space to form a first step 311, a second step 121 corresponding to the first step 311 (as shown in FIG. 10) is formed on the supporting portion 12, and the first step 311 and the second step 121 cooperate to block the light leakage path at the notches 220 of the folded edge 22. Specifically, the second step 121 is farther away from the body 11 of the frame 1 than the first step 311.

As shown in FIG. 7, at the connecting portion 310 of the backlight module, the light emitted by the optical film assembly 4 exits towards the space defined by the back plate corner stop 3, the base plate and the supporting portion 12. The first step 311 and the second step 121 are located on the light exit path, and can cooperate to block the light path and prevent light leakage.

As shown in FIG. 8, at a non-notch position of the folded edge 22 of the backlight module, the light emitted by the optical film assembly 4 exits towards the space defined by the back plate and the supporting portion 12, and the second step 121 and the bent portion of the folded edge are located on the light exit path, and can cooperate to block the light path and prevent light leakage.

As shown in FIG. 9, at the non-connecting-portion position 310 on the limiting portion 31 of the backlight module, the light emitted by the optical film assembly 4 exits towards the space defined by the back plate corner stop 3, the base plate and the supporting portion 12, and the first step 311 and the second step 121 are located on the light exit path, and can cooperate to block the light path and prevent light leakage.

In some embodiments, the optical film assembly 4 includes a light guide plate and a film which are sequentially arranged on the base plate 21.

It should be noted that the connection between the back plate 2 and the frame 1 and the connection between the display module 100 and the supporting portion 12 can refer to the related art. For example, the folded edge 22 of the back plate 2 is snap-fitted with the frame 1 by clamping hooks to realize the connection between the back plate 2 and the frame 1; the display module 100 and the supporting portion 12 are bonded by foam tapes.

The display device provided by this embodiment may be a rectangular display device without bezels on three sides or a rectangular display device without bezels on four sides, but is not limited to a rectangular display device without bezels on three sides or a rectangular display device without bezels on four sides. In other words, by cooperation of the backlight module of the display device of the present disclosure and the frame with the display module, there is no need to arrange a bezel structure that may cover the display distinction of part of the display module, thereby increasing the ratio of the display area in the overall display device (screen-to-body ratio).

Obviously, those skilled in the art can make various changes and variations to the present disclosure without departing from the spirit and scope of the present disclosure. In this way, if these modifications and variations of the present disclosure fall within the scope of the claims of the present disclosure and their equivalent technologies, the present disclosure is also intended to include these changes and variations.

The invention claimed is:

1. A backlight module, comprising:
   a back plate, comprising a base plate and a folded edge formed at an edge of the base plate, wherein the base plate cooperates with the folded edge to define an accommodating space and the folded edge is provided with notches at top corners of the back plate;
   an optical film assembly, arranged in the accommodating space; and
   a limiting assembly, configured to limit a relative position between the optical film assembly and the back plate, wherein the limiting assembly comprises back plate corner stops in one-to-one correspondence to the notches, and the back plate corner stops are fixedly arranged at the notches of the back plate.

2. The backlight module according to claim 1, wherein the folded edge comprises a plurality of sub-edges arranged in a circumferential direction of the back plate, and at a notch, two adjacent sub-edges are provided with missing portions to form the notch;
   the back plate corner stops are in one-to-one correspondence to the notches of the folded edge, and the back plate corner stops each comprise two limiting portions that are angled and connected to each other.

3. The backlight module according to claim 2, wherein a folded edge remaining portion is arranged between the notch and the base plate, and the limiting portion is provided with a concave portion for being matched with the folded edge remaining portion.

4. The backlight module according to claim 3, wherein a portion, configured to connect to a sub-edge, of the limiting portion is a connecting portion, and a surface, facing away from the accommodating space, of the connecting portion is located on an inner side of the sub-edge and abuts against the sub-edge.

5. The backlight module according to claim 4, wherein a bent portion extending into the accommodating space is formed at an end, facing away from the base plate, of the sub-edge, and the connecting portion is snap-fitted with the bent portion.

6. The backlight module according to claim 5, wherein a surface, facing away from the base plate, of the connecting portion subsides on a side facing away from the accommodating space to form a limiting step, and a portion, configured to connect to the connecting portion, of the bent portion comprises an insertion portion, and the insertion portion is snap-fitted with the limiting step.

7. The backlight module according to claim 1, wherein a surface, facing the back plate, of a back plate corner stop is bonded to the back plate.

8. The backlight module according to claim 1, wherein a back plate corner stop is an elastomer.

9. A display device, comprising a backlight module, a frame fixedly arranged on a periphery of a folded edge of a back plate, and a display module arranged on the frame, wherein the backlight module comprises:

the back plate, comprising a base plate and the folded edge formed at an edge of the base plate, wherein the base plate cooperates with the folded edge to define an accommodating space and the folded edge is provided with notches at top corners of the back plate;

an optical film assembly, arranged in the accommodating space; and a limiting assembly, configured to limit a relative position between the optical film assembly and the back plate, wherein the limiting assembly comprises back plate corner stops in one-to-one correspondence to the notches, and the back plate corner stops are fixedly arranged at the notches of the back plate.

10. The display device according to claim 9, wherein the frame comprises a frame-shaped body and a supporting portion formed on an inner surface of the frame-shaped body, wherein the supporting portion extends into a space defined by the frame-shaped body; wherein a surface, facing away from the base plate, of a back plate corner stop subsides on a side facing the accommodating space to form a first step, a second step corresponding to the first step is formed on the supporting portion, and the first step and the second step cooperate to block a light leakage path at a notch of the folded edge.

11. The display device according to claim 10, wherein the second step is farther from the frame-shaped body of the frame than the first step.

12. The display device according to claim 9, wherein the display device is a rectangular display device without bezels on three sides or a rectangular display device without bezels on four sides.

13. The display device according to claim 9, wherein the folded edge comprises a plurality of sub-edges arranged in a circumferential direction of the back plate, and at a notch, two adjacent sub-edges are provided with missing portions to form the notch;

the back plate corner stops are in one-to-one correspondence to the notches of the folded edge, and the back plate corner stops each comprise two limiting portions that are angled and connected to each other.

14. The display device according to claim 13, wherein a folded edge remaining portion is arranged between the notch and the base plate, and the limiting portion is provided with a concave portion for being matched with the folded edge remaining portion.

15. The display device according to claim 14, wherein a portion, configured to connect to a sub-edge, of the limiting portion is a connecting portion, and a surface, facing away from the accommodating space, of the connecting portion is located on an inner side of the sub-edge and abuts against the sub-edge.

16. The display device according to claim 15, wherein a bent portion extending into the accommodating space is formed at an end, facing away from the base plate, of the sub-edge, and the connecting portion is snap-fitted with the bent portion.

17. The display device according to claim 16, wherein a surface, facing away from the base plate, of the connecting portion subsides on a side facing away from the accommodating space to form a limiting step, and a portion, configured to connect to the connecting portion, of the bent portion comprises an insertion portion, and the insertion portion is snap-fitted with the limiting step.

18. The display device according to claim 9, wherein a surface, facing the back plate, of a back plate corner stop is bonded to the back plate.

19. The display device according to claim 9, wherein a back plate corner stop is an elastomer.

\* \* \* \* \*